US012093456B2

(12) United States Patent
Barascud et al.

(10) Patent No.: US 12,093,456 B2
(45) Date of Patent: Sep. 17, 2024

(54) BRAIN-COMPUTER INTERFACE

(71) Applicant: NextMind SAS, Paris (FR)

(72) Inventors: Nicolas Barascud, Paris (FR); Paul Roujansky, Paris (FR); Clement Royen, Paris (FR); Sid Kouider, Paris (FR)

(73) Assignee: NextMind SAS, Paris (FR)

( * ) Notice: Subject to any disclaimer, the term of this patent is extended or adjusted under 35 U.S.C. 154(b) by 0 days.

(21) Appl. No.: 17/629,714

(22) PCT Filed: Jul. 31, 2020

(86) PCT No.: PCT/EP2020/071702
§ 371 (c)(1),
(2) Date: Jan. 24, 2022

(87) PCT Pub. No.: WO2021/019088
PCT Pub. Date: Feb. 4, 2021

(65) Prior Publication Data
US 2022/0276707 A1    Sep. 1, 2022

Related U.S. Application Data

(60) Provisional application No. 62/880,704, filed on Jul. 31, 2019.

(51) Int. Cl.
*G06F 3/01*     (2006.01)
*G06F 18/214*   (2023.01)

(52) U.S. Cl.
CPC ............ *G06F 3/015* (2013.01); *G06F 18/214* (2023.01); *G06F 2218/02* (2023.01); *G06F 2218/12* (2023.01)

(58) Field of Classification Search
CPC ..... G06F 3/015; G06F 18/214; G06F 2218/12
(Continued)

(56) References Cited

U.S. PATENT DOCUMENTS 8,083,354 B2 * 12/2011 Derr ...................... A61B 5/398
                                                    351/239
8,583,223 B2 * 11/2013 Maddess ................ A61B 3/024
                                                    600/544
(Continued)

FOREIGN PATENT DOCUMENTS

CN        114698389 A      7/2022
WO     WO-2019040665 A1    2/2019
(Continued)

OTHER PUBLICATIONS

"International Application Serial No. PCT/EP2020/071702, International Search Report dated Oct. 9, 2020", 4 pgs.
(Continued)

*Primary Examiner* — Calvin C Ma
(74) *Attorney, Agent, or Firm* — Schwegman Lundberg & Woessner, P.A.

(57) ABSTRACT

An adaptive calibration method in a brain-computer interface is disclosed. The method is used to reliably associate a neural signal to an object whose attendance by a user elicited that neural signal. A visual stimulus overlaying one or more objects is provided, at least a portion of the visual stimulus having a characteristic modulation. The brain computer interface measures neural response to objects viewed by a user. The neural response to the visual stimulus is correlated to the modulation, the correlation being stronger when attention is concentrated upon the visual stimulus. Weights are applied to the resulting model of neural responses for the user based on the determined correlations. Both neural signal model weighting and displayed object display modulation are adapted so as to improve the certainty of the association of neural signals with the objects that evoked those signals.

20 Claims, 10 Drawing Sheets

(58) Field of Classification Search
USPC .......................................................... 345/156
See application file for complete search history.

(56) References Cited

U.S. PATENT DOCUMENTS

| | | | |
|---|---|---|---|
| 10,921,888 B2* | 2/2021 | Schiff | A61B 5/38 |
| 11,534,361 B2* | 12/2022 | Park | A61F 9/00 |
| 2010/0249532 A1* | 9/2010 | Maddess | A61B 3/024 |
| | | | 600/300 |
| 2020/0097076 A1* | 3/2020 | Alcaide | G06F 3/012 |
| 2020/0364539 A1* | 11/2020 | Anisimov | G06F 3/011 |

FOREIGN PATENT DOCUMENTS

| | | |
|---|---|---|
| WO | 2019144019 | 7/2019 |
| WO | WO-2021019088 A1 | 2/2021 |

OTHER PUBLICATIONS

"International Application Serial No. PCT/EP2020/071702, Written Opinion dated Oct. 9, 2020", 7 pgs.

"European Application Serial No. 20750257.6, Response to Communication Pursuant to Rules 161 and 162 EPC filed Sep. 13, 2022", 12 pgs.

"International Application Serial No. PCT/EP2020/071702, International Preliminary Report on Patentability dated Feb. 10, 2022", 9 pgs.

"European Application Serial No. 20750257.6, Response filed Dec. 29, 2023 to Communication Pursuant to Article 94(3) EPC mailed Nov. 22, 2023", 19 pgs.

"European Application Serial No. 20750257.6, Communication Pursuant to Article 94(3) EPC mailed Nov. 22, 2023", 6 pgs.

"Korean Application Serial No. 10-2022-7006634, Notice of Preliminary Rejection mailed Jul. 4, 2024", w/ English translation, 17 pgs.

* cited by examiner

BRAIN-COMPUTER INTERFACE

CLAIM OF PRIORITY

This application is a U.S. national-phase application filed under 35 U.S.C. § 371 from International Application Serial No. PCT/THP2020/071702, filed on Jul. 31, 2020, and published as WO 2021/019088 on Feb. 4, 2021, which claims the benefit of priority to U.S. Provisional Application Serial No. 62/880,704, filed on Jul. 31, 2019, each of which are incorporated herein by reference in their entireties.

TECHNICAL FIELD OF THE INVENTION

The present invention relates to the operation of brain-computer interfaces. In particular, the invention relates to the calibration of systems that employ brain-computer interfaces involving visual sensing.

STATE OF THE ART

Certain brain-computer interface (BCI) based systems make use of multiple electrodes attached to the head which can detect changes in electrical characteristics caused by brain activity. Although there are similarities in these neural signals produced by individuals due to these changes in electrical characteristics when the individuals perform identical functions, there remain significant differences in neural signal parameters among individuals. Thus, a system requiring reasonably accurate BCI results needs to be calibrated such that neural signals can be reliably associated with system-required controls and tasks. To preserve accurate associations throughout the duration of BCI use, it may be necessary to recalibrate a BCI because of changes in position of electrodes and other factors which may affect a neural-signal model's efficacy. However, calibration steps can be time consuming and disruptive. Thus, ideally, a calibration method that can unobtrusively and quickly perform calibration adaptations that correct for neural-signal changes could provide a multifaceted benefit by at least maintaining BCI accuracy and improving user BCI experience.

It is therefore desirable to provide brain-computer interfaces that address the above challenges.

SUMMARY

The present disclosure relates to a brain-computer interface system in which computer controls or monitors sensory stimuli that are perceptible by the individual while measuring brain activity of the individual. A model relating the sensory stimuli to the brain activity (i.e. the neural response) is then constructed and used to decode each individual's neural signals. The model and sensory stimuli are updated (i.e. calibrated) to ensure a more reliable association between stimuli and neural signals, thereby offering an improved user experience in the performance of graphical interface tasks. In certain embodiments, the BCI system is a visual BCI system and the sensory stimuli are visual stimuli.

According to a first aspect, the present disclosure relates to a computer implemented method comprising, in at least one processor: in an initial phase, receiving, from a neural signal capture device, a first set of neural signals for a user, the user perceiving sensory information in a training sequence, the training sequence including at least one sensory stimulus, each sensory stimulus having at least one predetermined corresponding characteristic modulation; determining, from the first set of neural signals and the training sequence, neural response data associated with each of the one or more sensory stimuli, the neural response data being combined to generate a model of user neural response to sensory stimuli, the model including weights applied to features of the neural signals; in a calibration phase, receiving, from the neural signal capture device, a second set of neural signals for the user, the user perceiving further sensory information in a confirmation sequence, the confirmation sequence including at least one of the sensory stimuli; using the model, estimating which of the sensory stimuli is an object of focus of the user; determining whether the estimated identification of the object of focus corresponds to the sensory stimuli in the confirmatory sequence; if a correspondence is determined, modifying the weights; and if no correspondence is determined, modifying the sensory stimuli in the confirmation sequence.

According to a second aspect, the present disclosure relates to a brain computer interface system, comprising: a sensory information generation unit configured to output a signal for reproduction by a reproduction device, the reproduced signal being perceived by a user as sensory information; a neural signal capture device configured to capture neural signals associated with a user; and a signal processing unit operatively coupled to the sensory information generation unit and the neural signal capture device, the signal processing unit being configured to: in an initial phase, receive, from the neural signal capture device, a first set of neural signals for the user, the user perceiving the sensory information in a training sequence, the training sequence including at least one sensory stimulus, each sensory stimulus having at least one predetermined corresponding characteristic; determine, from the first set of neural signals and the training sequence, neural response data associated with each of the one or more sensory stimuli, the neural response data being combined to generate a model of user neural response to sensory stimuli, the model including weights applied to features of the neural signals; in a calibration phase, receive, from the neural signal capture device, a second set of neural signals for the user, the user perceiving further sensory information in a confirmation sequence, the confirmation sequence including at least one of the sensory stimuli; using the model, estimate which of the sensory stimuli is an object of focus of the user; determine whether the estimated identification of the object of focus corresponds to the sensory stimuli in the confirmatory sequence; if a correspondence is determined, modify the weights; and if no correspondence is determined, modify the sensory stimuli in the confirmation sequence.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Brain-computer interfaces (BCIs) seek to interpret measured brain activity in an individual to allow the determination (i.e. inference) of the focus of attention in that individual. That inferred focus of attention may be used to perform an input or control task in an interface with a computer (which may be a component of the BCI). The computer controls or monitors sensory stimuli that are perceptible by the individual so that the sensory stimuli may be related to measured brain activity.

In certain embodiments, the BCI system is a visual BCI system and the sensory stimuli are visual stimuli. In visual BCIs, neural responses to a target stimulus, generally among a plurality of generated visual stimuli presented to the user, are used to infer (or "decode") which stimulus is essentially the object of focus (of visual attention) at any given time. The object of focus can then be associated with a user-selectable or -controllable action.

Analogous provisions may be made for non-visual BCI systems where the target stimulus used to infer focus may include audible and haptic/touch stimuli.

Neural responses may be obtained using a variety of known techniques. One convenient method relies upon surface electroencephalography (EEG), which is non-invasive, has fine-grained temporal resolution and is based on well-understood empirical foundations. Surface EEG (sEEG) makes it possible to measure the variations of diffuse electric potentials on the surface of the skull (i.e. the scalp) of a subject in real-time. These variations of electrical potentials are commonly referred to as electroencephalographic signals or EEG signals. Other techniques are of course available and capable of being used instead of (or in conjunction with) surface EEG— examples include intercranial EEG (iEEG) [also referred to as electrocorticography (ECoG)], magnetoencephalography (MEG), functional magnetic resonance imaging (fMRI), functional near-infrared spectroscopy (fNIRS), etc.

In a typical visual BCI, the computer controls the display of visual stimuli in a graphical interface (i.e. display) generated and presented by a display device. The computer also generates a model of previous neural responses to the visual stimuli that is used to decode each individual's current neural signals.

Figure 8:
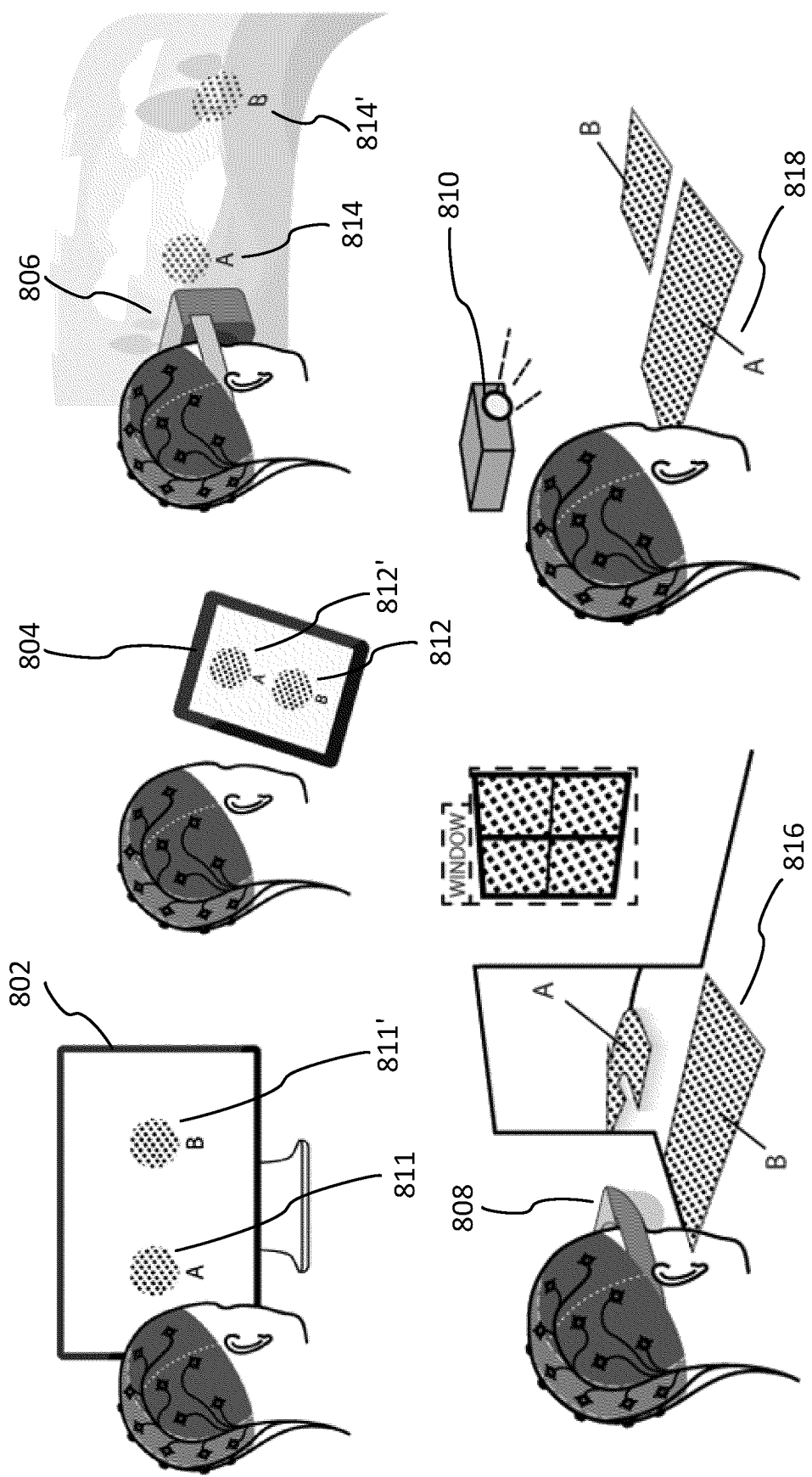
FIG. 8 illustrates various examples of display device suitable for use with the BCI system of the present disclosure.

Examples of suitable display devices (some of which are illustrated in FIG. 8) include television screens & computer monitors 802, projectors 810, virtual reality headsets 806, interactive whiteboards, and the display screen of tablets 804, smartphones, smart glasses 808, etc. The visual stimuli 811, 811', 812, 812', 814, 814', 816 may form part of a generated graphical user interface (GUI) or they may be presented as augmented reality (AR) or mixed reality graphical objects 816 overlaying a base image: this base image may simply be the actual field of view of the user (as in the case of a mixed reality display function projected onto the otherwise transparent display of a set of smart glasses) or a digital image corresponding to the user's field of view but captured in real-time by an optical capture device (which may in turn capture an image corresponding to the user's field of view amongst other possible views).

Inferring which of a plurality of visual stimuli (if any) is the object of focus at any given time is fraught with difficulty. For example, when a user is facing multiple stimuli, such as for instance the digits displayed on an on-screen keypad or the icons displayed in a graphical user interface, it has proven nearly impossible to infer which one is under focus directly from brain activity at a given time. The user perceives the digit under focus, say digit 5, so the brain must contain information that distinguishes that digit from others, but current methods are unable to extract that information from brain activity alone. That is, current methods can infer that a stimulus has been perceived, but they cannot determine which specific stimulus is under focus using brain activity alone.

To overcome this issue and to provide sufficient contrast between stimulus and background (and between stimuli), it is known to configure the stimuli used by visual BCIs to blink or pulse (i.e. so that each stimulus has a distinguishable characteristic profile over time). The flickering stimuli give rise to measurable electrical responses. Specific techniques monitor different electrical responses, for example steady state visual evoked potentials (SSVEPs) and P-300 event related potentials. In typical implementations, the stimuli flicker at a rate exceeding 6 Hz. As a result, such visual BCIs rely on an approach that consists of displaying, in a display device, the various stimuli discretely rather than constantly, and typically at different points in time. Brain activity associated with attention focused on a given stimulus is found to correspond (i.e. correlate) with one or more aspect of the temporal profile of that stimulus, for instance the frequency of the stimulus blink and/or the duty cycle over which the stimulus alternates between a blinking state and a quiescent state.

Thus, decoding of neural signals relies on the fact that when a stimulus is turned on, it will trigger a characteristic pattern of neural responses in the brain that can be determined from electrical signals, i.e. the SSVEPs or P-300 potentials, picked up by electrodes of an EEG device, for example. This neural data pattern might be very similar or even identical for the various digits or icons, but it is time-locked to (i.e. synchronized with) characteristic profile over time for the digit/icon being perceived: only one digit/icon may pulse at any one time so that the correlation with a pulsed neural response and a time at which that digit/icon pulses may be determined as an indication that that digit/icon is the object of focus. By displaying each digit/icon at different points in time, turning that digit/icon on and off at different rates, applying different duty cycles, and/or simply applying the stimulus at different points in time, the BCI algorithm can establish which stimulus, when turned on, is most likely to be triggering a given neural response, thereby allowing a system to determine the target under focus. Time stamps for the data being presented on the display may be shared with the visual BCI and used to synchronize visual stimuli with the corresponding neural response. This is discussed further below.

More generally, modulations applied to sensory stimuli are combined with a model of neural responses using previous neural responses to allow current neural responses to be interpreted. The model provides a confidence value (i.e. model weighting) with which a signal feature (in the neural response evoked by sensory stimulus) may be associated with an object of focus of attention.

The model of previous neural responses to the visual stimuli is used to decode each individual's current neural signals in an operation termed "stimulus reconstruction".

Co-pending U.S. patent application No. 62/843,651 filed on May 6, 2019 (docket number 3901.00.0001), the entire specification of which is incorporated herein by reference, describes one approach to the challenge of determining the object of focus (the target) from the objects peripheral to the target (the distractors) with speed and accuracy. This approach relies upon characteristics of the human visual system.

A system requiring reasonably accurate BCI results also requires each individual's neural signals to be calibrated such that neural signals can be reliably associated with system-required controls and tasks. Furthermore, it may be necessary to recalibrate a BCI because of changes in position of electrodes and other factors which may affect a neural-signal model's efficacy to preserve accurate associations throughout the duration of BCI use. However, calibration steps can be time consuming and disruptive.

Consequently, there is a need for a calibration method that can unobtrusively and quickly perform calibration adaptations that correct for neural-signal changes could provide a multifaceted benefit by at least maintaining BCI accuracy and improving user BCI experience.

Today, there are essentially two methods for BCI calibration: operant conditioning and "machine learning." Operant conditioning keeps details of the interface hidden from a user and enables the user, by trial and error, to slowly "learn" how to move screen objects and invoke tasks using brain activity. Obviously, this can be both frustrating and time consuming, thus it is no one's first choice for today's calibration needs.

With machine learning, a user interacts with one or more display targets on a display screen by choosing one to pay attention to (i.e. attend). Where multiple display targets are displayed, each display targets may have a display characteristic that is unique to each object so that attention to one particular target might elicit a response that "encodes" the unique display characteristic for that target, as discussed above.

Where, for example, the objects are made to blink at different blink rates, the object a user is attending will stimulate a neural response and signal that can be differentiated by signal characteristics that mirror that object's blink rate. A neural-signal model, associated with that modulation and signal characteristics evoked by the modulation, can be constructed which will then be used to associate that modulation and the neural-signal it stimulates.

However, as previously mentioned, the electrode positions may change throughout or between consecutive recording sessions, and external interference may add electromagnetic interference, noise and other artifacts to a neural signal. In either case, the detected signal may now no longer match a model constructed previously, so the BCI can no longer link a neural-signal to a displayed stimulus modulation with sufficient certainty. It becomes necessary to re-calibrate the model of neural responses to the sensory stimuli.

Prior art BCIs related to visual BCIs have used either neurofeedback or model weighting to try and adapt a BCI to changing neural-signal conditions.

Neurofeedback is a type of biofeedback in which neural activity is measured (through sEEG, MEG, iEEG/ECoG, fMRI or fNIRS, for example), and a sensory representation of this activity is presented to the user in order to self-regulate their mental state and/or to adapt their behavior accordingly. In neurofeedback approaches, the user is presented with information that they can use to train their interact with the BCI, e.g. "learning" how to move screen objects and/or invoke tasks using brain activity. The feedback may be a highlighting of an object currently determined to be an object of focus, by changing the color, size, display location or other aspect of appearance of that object.

Model weighting in the context of visual BCIs refers to the training of a machine learning system. The weightings are associated with the prediction of the user's intention. In conventional calibration procedures, signal features in the neural signals that give the best matches to neural signal patterns for known visual stimuli are given greater weighting than those that are less reliable.

There are several ways of extracting a set of signal features from a single channel or region of interest (i.e. group of channels originating in electrodes at such a region) from the neural signal. In the case of MEG or EEG, some examples of features derived from the neural time-series include: Event Related Potentials (ERPs), Evoked Potentials (which may be visually evoked potentials, auditory evoked potentials, sensory evoked potentials, motor evoked potentials), oscillatory signals (signal power in specific frequency bands), slow cortical potentials, brain state dependent signals, etc.

In visual BCI embodiments, the present disclosure builds on techniques for discerning which objects of (potential) interest within the field of view of a user (typically, but not always on a display presented to the user) are the focus of visual attention. As noted above, modulation of one or more of these objects makes the object blink or otherwise visually alter so that the modulation acts as a stimulus for a correlated neural response. The neural response may in turn be measured and decoded to determine which object of interest is the focus of the user's attention. The object determined to be focus of attention is then visibly modified so that the user understands the outcome of the decoding and is encouraged to continue to exhibit the activity eliciting the determination, confirming (i.e. validating) the decoding (or to discontinue since that activity, flagging an unwanted decoding outcome). Either way the strength of the association between visual stimuli and correlated neural response may be adjusted according to the accuracy of the decoding as determined by the user's response to the modified focus of attention.

Certain embodiments of the method disclosed herein use both techniques in conjunction—altering object modulation for more definitive association while also altering model weighting for a better match. The model weightings and the modulation of visual stimuli are updated (i.e. calibrated) in real-time to ensure a more reliable association between (reconstructed) stimuli and neural signals, thereby offering an improved user experience in the performance of graphical interface tasks. This results in a 'closed-loop' or adaptive neurofeedback efficiently changing an experimental task in real time on the basis of neural activity.

In addition, the disclosed method may employ neural-signal filtering to remove artifacts that could confound an associative model. Thus, the method may be selective in that it determines if a neural signal is informative by ensuring that any artifacts (i.e. interference due to movement or background electromagnetic conditions, noise, etc.) are filtered out, first, before attempting to associate a signal with modulation.

Where a display employs multiple display targets (with associated modulated stimuli), this adaptive method repeats the process of modulation association and refinement with each newly attended display target. Hence, the model is essentially refined by these new trials.

In certain embodiments of the calibration method disclosed herein, both object modulation and model weighting are subject to refinement. As a result, the calibration method is faster and more accurate than a conventional calibration method holding one factor, such as display target stimulus modulation, fixed. Furthermore, the described calibration method lends itself to a less obtrusive process whereby calibration can be ongoing, in the background, as a user engages with the BCI for a variety of applications, such as games or hands-free productivity tools.

In essence, the method creates a closed-loop process wherein real-time neurofeedback enhances user attention and focus, which in turn enhances EEG signals evoked by the user's attention and focus, which improves BCI decoding accuracy, which can increase user immersion.

In certain embodiments, the adaptive calibration method can be used with systems employing a BCI for enabling hands-free system control. To detect brain activity the two most prominent methods involve electroencephalography (EEG) whereby electrodes placed on a user's scalp ("surface EEG"), or inserted directly inside the brain (i.e. "intercranial EEG", iEEG, or electrocorticography, ECoG), will detect the changes in electric field produced by neuron synaptic activity. Each person's brain, while largely similar, are different. Two people exposed to the same stimuli will have different specific EEG results but will usually display temporal and spatial response similarities. Therefore, any system that depends upon decoding neural signals and associating them with specific system controls will need to calibrate its operation to an individual's specific EEG neural signal.

The accuracy of system control is directly affected by the accuracy and certainty of the associations of neural signals with intended system controls.

As noted above, in the early period of BCI technology, experimenters often relied on operant conditioning whereby a user would use trial-and-error attempts to condition mental approaches to system responses. This would often take significantly long training periods to achieve a modicum of success. As the art developed, machine learning techniques were applied that mapped out neural signal response to specific end results. So, for example, if a user was shown a display screen with one or one among many objects and instructed to focus on one object. If consistent neural signals were captured while the user "attended" an object, one could begin associating that signal with that object, and so on.

However, with a screen having several objects representing data or control invocations, it is often difficult to associate neural signals with those objects with high degrees of certainty. As discussed above, one way of addressing this difficulty is to cause the objects (referred to as "display targets" or stimuli associated with such targets) to blink at differing rates, have different light intensities, increased contrast change, color transformation, geometric deformation, rotation, oscillation, displacement along a path, and so on. In the case of differing blink rates, as an example, temporal distinctions between the objects' on-off states would be mirrored in the detected neural signals. Thus, by looking at the time of various signal variations and correlating them with blink rates, one could associate these signals with objects with a higher degree of certainty. Thus, modulating the display patterns so as to give each object display distinctions, while risking annoyance to users, increased the certainty of associating signals with objects.

Those practiced in BCI art are aware of the various methods for representing neural signals and processing them to produce reliable models. They are also aware of the various ways there are for modulating objects displayed to create readily identifiable distinctions in the neural-signal patterns they evoke. Thus, when the term "modulation" or any variation of that term is used it should be broadly interpreted to encompass any of the known ways of modulating the display characteristics of displayed objects.

Likewise, when the term "signal processing" or any variation of that term is used, it should be broadly interpreted to encompass any of the known ways of processing neural signals. When the term "filtering" or any variation of that term is used it should be broadly interpreted to encompass any of the known means of filtering a neural signal to mitigate or eliminate artifacts, such as neural signals or brain rhythms that are not relevant to determining the attended object.

In addition, system implementations that support brain-computer interactions are also well known in the art. The most common involve head-worn helmets with distributed electrodes allowing parallel detection of electric-field variations while a user engages in an activity.

In certain embodiments according to the present disclosure, operation of the BCI includes a brief, initialization and calibration phase. As users may differ markedly in terms of their baseline neural responses to identical stimuli (in particular those having an impaired or damaged visual cortex), the calibration phase may be used to generate a user-specific model of stimulus reconstruction. Such a phase may take less than a minute to construct (typically, ~30 s).

Embodiments according to the present disclosure implement a method for "adaptive calibration" of a system employing a BCI. The method allows for the need for recalibration due to distracted user focus, change in helmet/electrode position, "noisy" signal conditions and the like which can introduce artifacts to the signal. Thus, rather than initiating a single calibration event and risking loss of certainty due to changes, this method is adaptive and is designed to allow unobtrusive calibration to be repeated, as necessary, with minimal user distraction. It also makes use of changes in object display modulation and model weightings to refine and improve neural-signal modeling for greater degrees of operational dependability.

Figure 1:
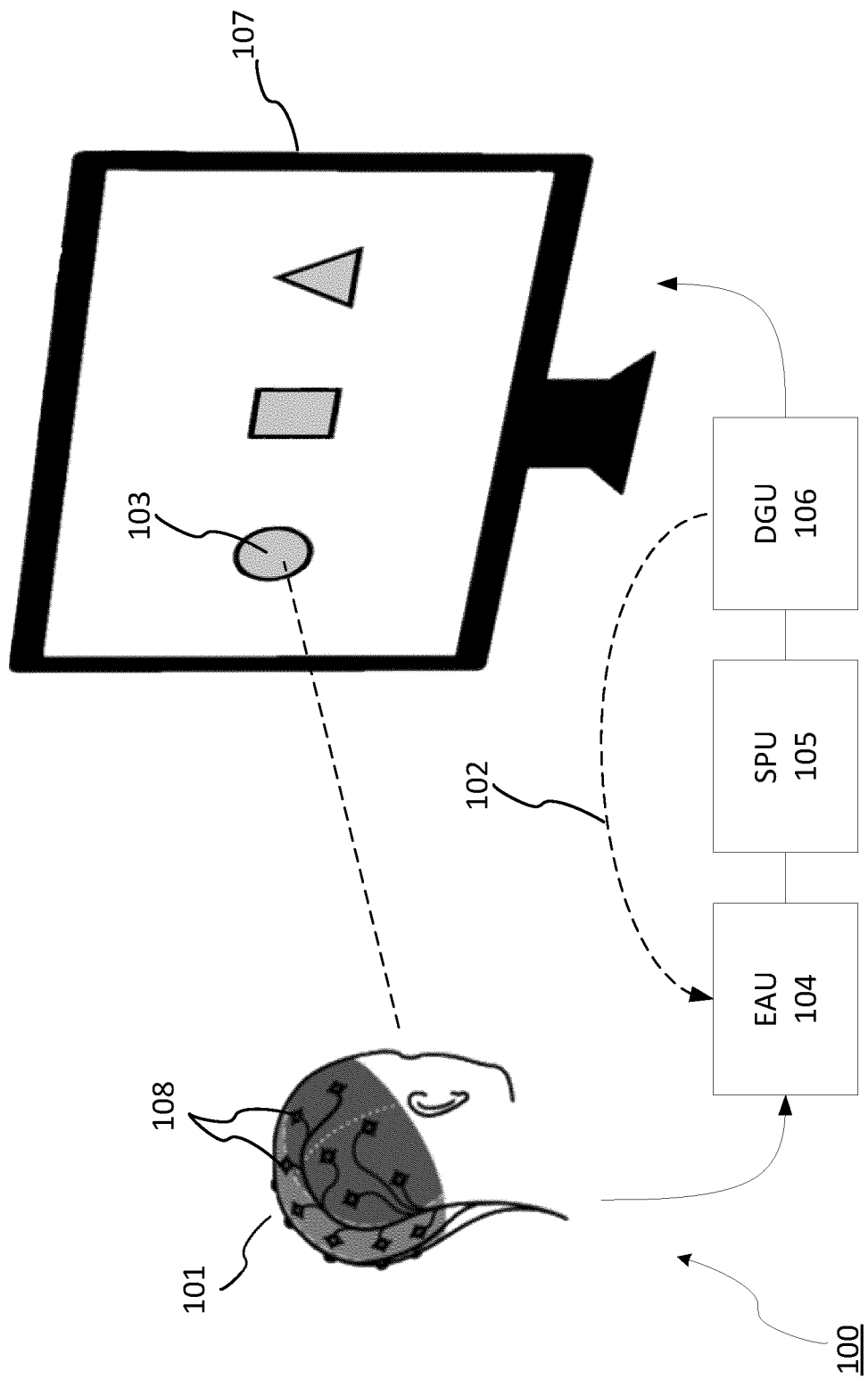
FIG. 1 depicts an electronic architecture of a BCI system for receiving and processing EEG signals according to the present disclosure.

FIG. 1 illustrates an example of an electronic architecture for the reception and processing of neural signals by means of a BCI device 100 according to the present disclosure. A user with an electrode helmet 101 on his/her head gazes at a display 107 having one or more objects and attends one object 103. The helmet detects essentially concurrent changes in electric fields and each electrode provides a time-varying output signal. Collectively, the combination of electrodes provides a temporally parallel set of electrode signals. The individual electrodes are fed into an EEG acquisition unit (EAU, 104) which conveys its results to a signal processing unit (SPU, 105) whose processing results are used to control a display generation unit (DGU, 106). The DGU 106 in turn controls the presentation of image data on a display 107. The DGU may also provide timestamp information 102 for the image data. It is essentially a closed-loop system in that any changes made by the DGU 106 will affect the display 107 and be fed back through the user's neural response.

To measure diffuse electric potentials on the surface of the skull of a subject, surface EEG devices include a portable device (i.e. a cap or headpiece). In FIG. 1, this portable device is exemplified as the electrode helmet 101. The portable device 101 of FIG. 1 includes one or more electrodes 108, typically between 1 and 128 electrodes, advantageously between 2 and 64, advantageously between 4 and 16.

Each electrode 108 may comprise a sensor for detecting the electrical signals generated by the neuronal activity of the subject and an electronic circuit for pre-processing (e.g. filtering and/or differentially amplifying) the detected signal before analog-digital conversion: such electrodes being termed "active". The active electrodes 108 are shown in use in FIG. 1, where the sensor is in physical contact with the subject's scalp. The electrodes may be suitable for use with a conductive gel or other conductive liquid (termed "wet" electrodes) or without such liquids (i.e. "dry" electrodes).

The EAU 104 may include analog-digital conversion (ADC) circuitry and a microcontroller. Each ADC circuit is configured to convert the signals of a given number of active electrodes 108, for example between 1 and 128.

The ADC circuits are controlled by the microcontroller and communicate with it for example by the protocol SPI ("Serial Peripheral Interface"). The microcontroller packages the received data for transmission to an external processing unit (the SPU 105 in FIG. 1). The SPU may be, for example, a computer, a mobile phone, a virtual reality headset, a gaming console, an automotive or aeronautical computer system, etc.

In certain embodiments, each active electrode 108 is powered by a battery (not shown in FIG. 1). The battery is conveniently provided in a housing of the portable device 101.

In certain embodiments, each active electrode 108 measures a respective electric potential value from which the potential measured by a reference electrode (Ei=Vi−Vref) is subtracted, and this difference value is digitized by means of the ADC circuit then transmitted by the microcontroller.

In certain embodiments, the DGU 106 uses the processing results from the SPU 105 to alter the target objects for display in a graphical user interface of a display device (such as display 107). The target objects may include control items and the control items are in turn associated with user-selectable actions.

In the system 100 of FIG. 1, an image is displayed on a display of a display device 107. The subject views the image on the display 107, focusing on a target object 103.

In an embodiment, the display device 107 displays at least the target object 103 as a graphical object with a varying temporal characteristic distinct from the temporal characteristic of other displayed objects and/or the background in the display. The varying temporal characteristic may be, for example, a constant or time-locked flickering effect altering the appearance of the target object at a rate greater than 6 Hz. In another embodiment, the varying temporal characteristic may use a pseudo-random temporal code so that a flickering effect is generated that alters the appearance of the target object a few times a second on average, for example at a rate that is on average 3 Hz. Where more than one graphical object is a potential target object (i.e. where the viewing subject is offered a choice of target object to focus attention on), each object is associated with a discrete spatial and/or temporal code.

Figure 2:
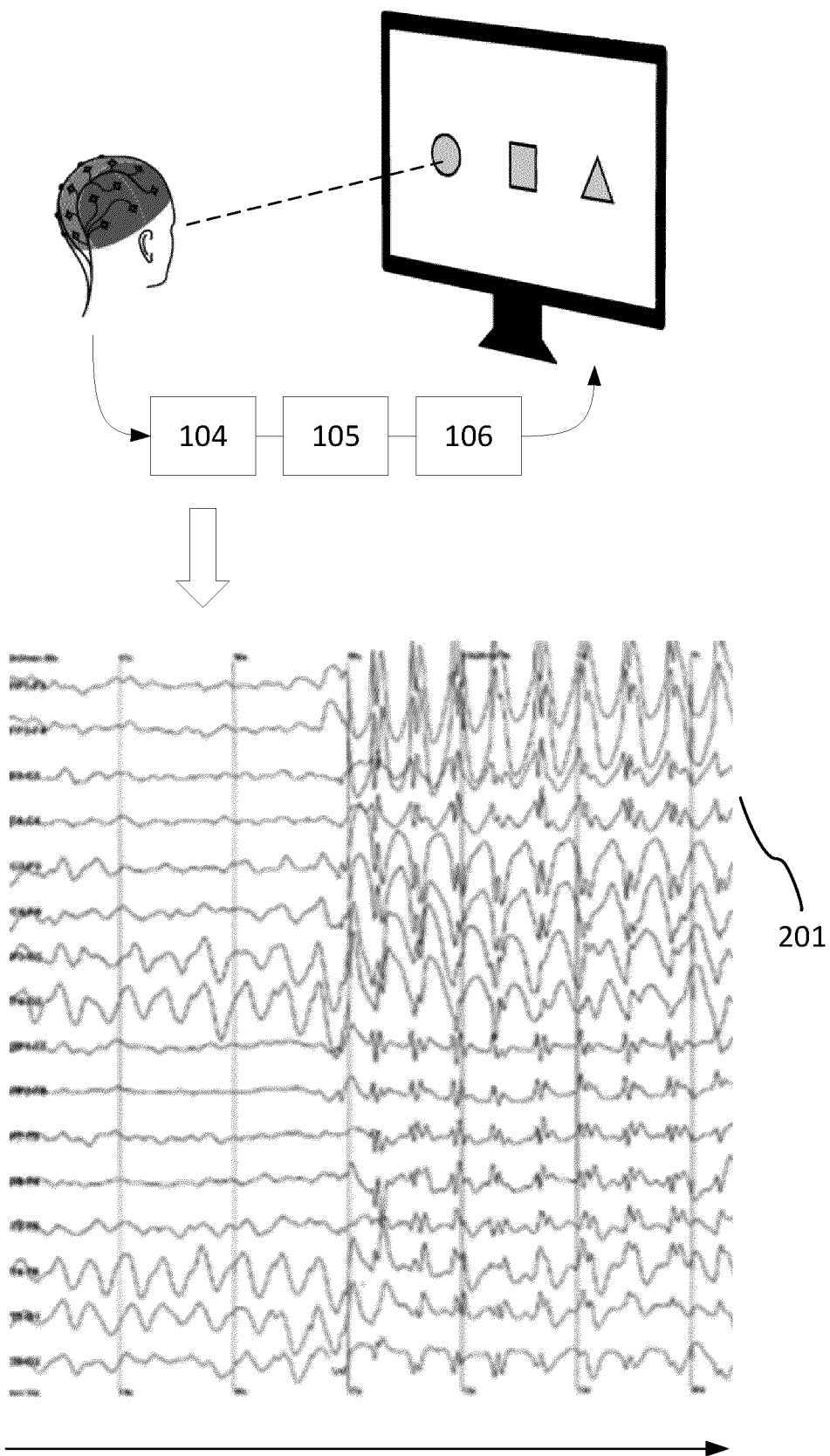
FIG. 2 shows how the system of FIG. 1 captures a neural signal that can be associated with attending a displayed object.

In FIG. 2, one is shown a representation of the parallel-occurring signals 201 detected by the electrodes in the electrode helmet 101 as acquired at the EAU 104. The respective signal traces of each electrode's response are shown spaced apart vertically but sharing the same time axis: so that time runs in the horizontal and the height of the traces vertically above or below the horizontal represents the strength of response for that electrode at that moment in time. Using any of several well-known signal-processing methods one can refine the responses to the most relevant signal characteristics.

Figure 3:
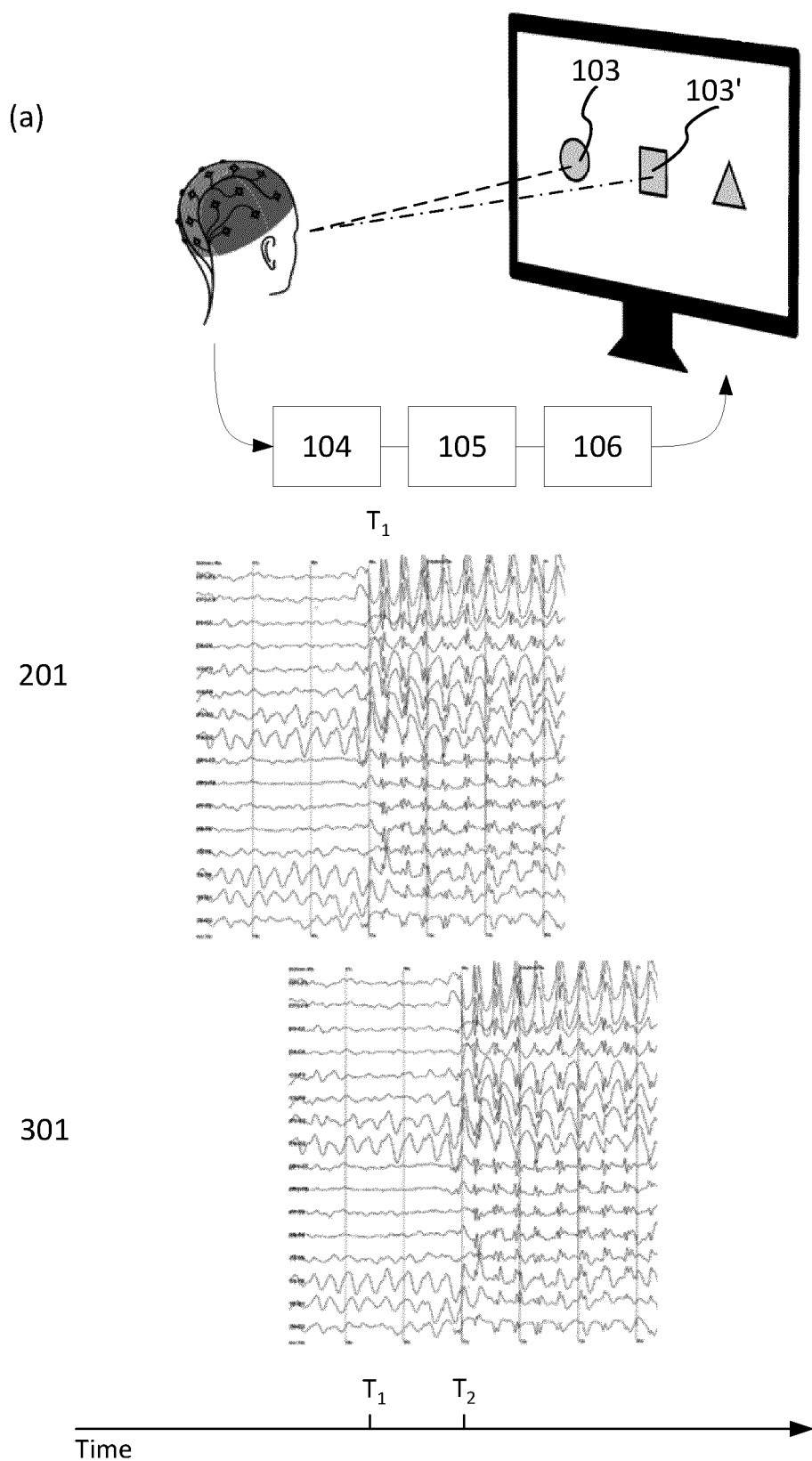
FIG. 3 shows how the system of FIG. 1 captures neural signals when each displayed object has its own modulated display characteristic, the neural signals differing temporally from one another.

In FIG. 3, the signal pattern 201 associated with the user attending object 103 is contrasted with signal pattern 301 associated with the user instead attending a second object 103', and the blink rates of objects 103 and 103' were such that 103 blinked on at time $T_1$ and 103' blinked at time $T_2$, one would be able to distinguish that change by comparing where, in time, the corresponding stimulus responses began. This is just one way of modulating the objects graphical properties so as to uniquely associate a given EEG signal/segment to the object that is being attended.

The EAU 104 detects neural responses (i.e. tiny electrical potentials indicative of brain activity in the visual cortex) associated with attention focused on the target object; the visual perception of the varying temporal characteristic of the target object(s) therefore acts as a stimulus in the subject's brain, generating a specific brain response that accords with the code associated with the target object in attention. The detected neural responses (e.g. electrical potentials) are then converted into digital signals and transferred to the SPU 105 for decoding. The sympathetic neural response, where the brain appears to "oscillate" or respond in synchrony with the flickering temporal characteristic is referred to herein as "neurosynchrony".

The SPU 105 executes instructions that interpret the received neural signals to determine feedback indicating the target object having the current focus of (visual) attention in real-time. Decoding the information in the neural response signals relies upon a correspondence between that information and one or more aspect of the temporal profile of the target object (i.e. the stimulus). In the example of FIG. 3, signal patterns 201 & 301 represent a simple model of the signal pattern associated with focus on objects 103 and 103' respectively: the received neural signals may be compared (here in terms of timing), to determine which pattern is the closest match to the received neural signals).

In certain embodiments, the SPU 105 and EAU 104 may be provided in a single device so that decoding algorithms are executed directly on the detected neural responses.

In certain embodiments, the DGU 106 may conveniently generate the image data presented on the display device 107 including the temporally varying target object. In certain embodiments, the SPU 105 and DGU 106 may be provided in a single device so that information regarding the determined focus of visual attention may be incorporated in the generation of (and modulation of) the visual stimuli in the display.

In certain embodiments, the display device 107 displays an overlay object as a graphical object with a varying temporal characteristic distinct from the temporal characteristic of other displayed objects and/or the background in the display, the overlay object is then displayed as a graphical layer over at least an identified target object.

The visual stimulus (i.e. temporally varying target object or overlay object) may provide a retrospective feedback to the user, validating their selection. The user may conveniently be presented with visual feedback on the display screen 107, so that they are aware that the target object 103 is determined to be the current focus of attention. For example, the display device may display an icon, cursor, or other graphical object or effect in close proximity to the target object 107, highlighting (e.g. overlaying) the object that appears to be the current focus of visual attention. This provides a positive feedback loop (where the apparent target object is confirmed (i.e. validated) as the intended target object by virtue of prolonged attention and the association determined by the neural response model for the user is strengthened.

Figure 4:
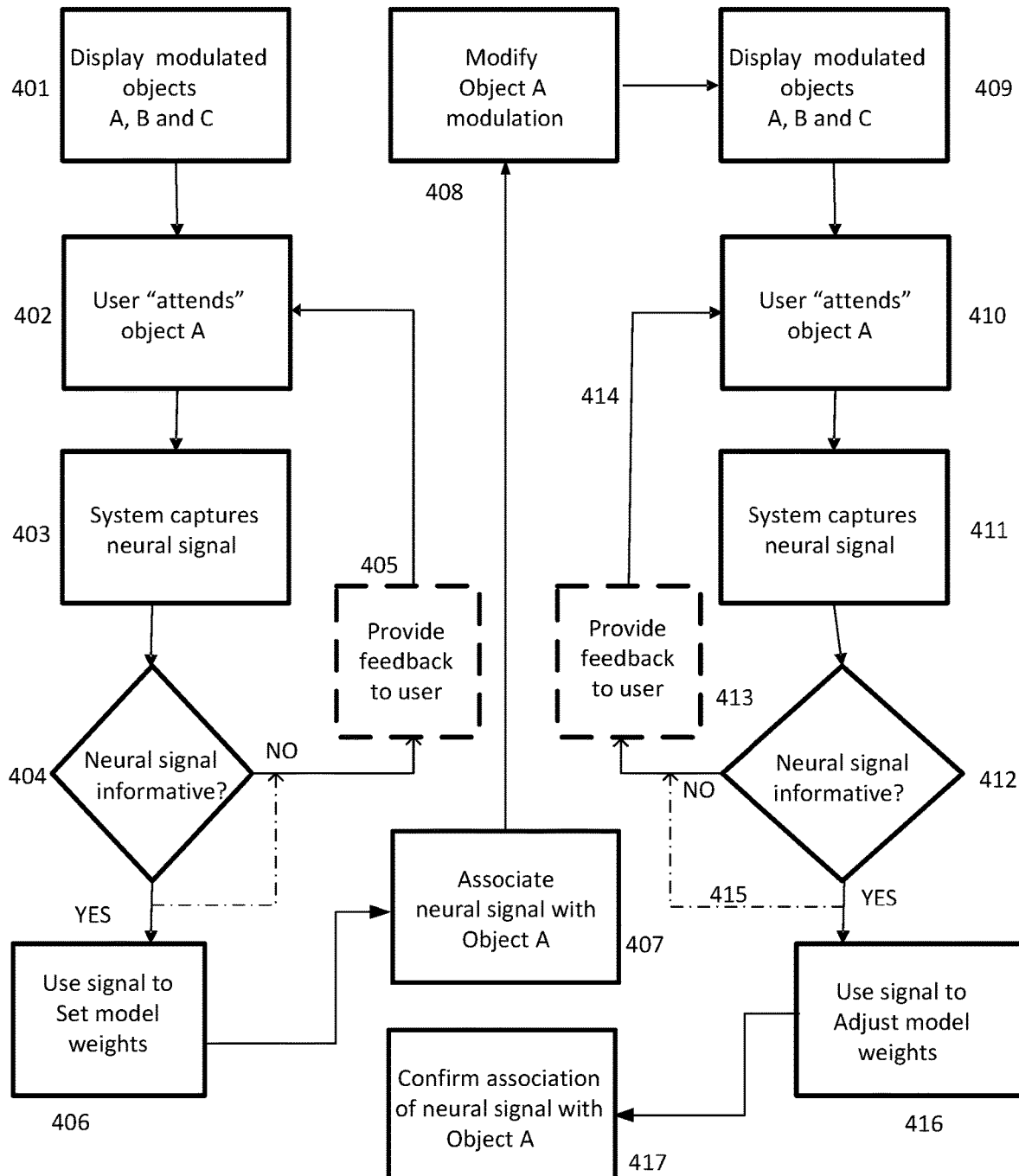
FIG. 4 shows a flow diagram showing the flow of certain functional blocks in a calibration method according to the present disclosure.

FIG. 4 is a flow diagram showing the flow of certain functional blocks in an embodiment according to the present disclosure. As shown, the flow begins with an initial sequence (operations 401-407).

At operation 401, objects A, B and C are displayed, using the DGU 106 of the BCI 100 of FIG. 1, say: this might be the three shapes illustrated on the display unit in FIGS. 1-3, for example. The user then attends object A (operation 402). Essentially concurrently, a neural signal is captured (operation 403). The capture of neural signal may be performed by EAU 104.

A decision is optionally made, by the SPU 105 say, as to whether that signal is informative—for example, whether the signal quality is good enough to be used to predict user focus of attention (operation 404). The presence of artifacts (e.g. interference or noise) in the signal can render it uninformative, as can a lack of sufficiently stable attention/gaze with respect to a single object.

While not illustrated in FIG. 4, a determination that the signal is not informative (operation 404, NO), may trigger a reduction in the number of objects presented to the user (simplifying the task of classifying the neural signals) and/or an alteration in an appearance of the objects (e.g. increasing the size of the stimulus to ensure the user sees it). In such cases, the flow returns to the initial sequence with the display of the objects (operation 401).

Feedback may be provided to the user about the accuracy/confidence with which the signal can be used to predict user focus of attention (operation 405). The feedback to the user may take the form of a graphical, textual, haptic or audible message, for example. Thus, for example, if the signal is not informative (NO), the user is informed, being instructed to reduce blinking or stop glancing away from the object, for instance. Optionally, the user may be informed that the signal does appear to be informative (YES), with the positive feedback being provided to confirm that the user is making progress, say.

The test of whether a signal is informative may be a comparison against a threshold value (such as a threshold signal to noise ratio, etc.). However, it is equally contemplated that this test may be implemented by one or more algorithms specifically dedicated to predicting whether the signal is informative or not (and labelling accordingly). The algorithms may, for example, use adaptive Bayesian classifiers or linear discriminant analysis (LDA) classifiers. Indeed, some classifiers (such as LDA or Bayesian classifiers) are completely determined by means and variances of the BCI data from individual classes (e.g. "informative", "not informative") and the number of samples from each class, which can be updated incrementally and robustly with new input data without knowing class labels. This is a kind of pseudo-supervised approach in which labels a posteriori estimated by the Bayesian/LDA classifier are used in the adaptation process. When the probability that the signal is clean is not high enough, the incorrectly estimated labels would damage the parameter adaptation, similar to noise or outliers in supervised learning.

Once the signal is deemed informative (operation 404, YES), the model weights may be set (operation 406). Model weights are discussed below, with one particular example being the parameters of the stimulus reconstruction algorithm described in the context of FIG. 6. The signal and object A are associated (operation 407), meaning that user focus of attention is determined to be on object A with the current signal.

By restricting the user to a single stimulus (object A) at a time, the model can ensure that the association between signal and object is correct. This process may be repeated, with the user asked to attend to objects B and C in turn. Indeed, the user may be given less choice by displaying only one object at a time in the initial sequence. The resulting plurality of weights forms a decoding model used to decode the focus of attention.

Equally, the user may be presented with one or more object while another objective method is used to determine the true association between focus of attention and signal (for example, using a short supervised training session where the user's eye movements are tracked).

In these cases, the model weights are set using firm knowledge of the association. Such embodiments are suitable where no prior information is available and may be characterized as "cold start" or "from scratch" embodiments.

It is also possible to start a calibration phase by using predetermined weights and then to adjust those weights according to their accuracy for the current user/electrode positioning, etc. These weights may be obtained, for instance, from previous session from that user, or an 'average' model obtained by training the algorithms on a database of previous EEG recordings. While models based on the predetermined weight would not be expected to be perfectly tailored to the current user's neural signals, they are found to provide an effective approximation upon which the calibration method of the present disclosure may build. Such embodiments may be characterized as "warm start" embodiments. In certain embodiments, the use of predetermined weights can allow the calibration to replace the initial sequence (operations 401-407) by a step of retrieving a model with predetermined (i.e. using old weighting data for the user and/or default or averaged values of the weights) from storage, effectively rendering the initial sequence optional.

Then, a confirmatory sequence (operations 408-417) is performed, validating the accuracy of the decoding model.

At operation 408, the modulation of object A is modified. The display is caused (by the DGU 106, say) to reflect that modification (operation 409). As the user continues to attend object A (operation 410), a confirmatory neural signal is captured (operation 411). The quality of the confirmatory neural signal is optionally determined (operation 412), using the same optional process as determining a neural signal's "informative" status at operations 404 and 405.

Feedback may again be provided to the user about the accuracy/confidence with which the signal can be used to predict user focus of attention (operation 413, mirroring operation 405). Thus, if the confirmatory neural signal is determined to be "not informative" (NO), the user may be informed that the confirmation sequence will continue. Confirmatory neural signals continue to be captured until a decision is made, by the SPU 105 say, that the confirmatory neural signal is informative (operation 412, YES). This positive outcome, too, may be provided to the user (operation 415).

The model weights may be adjusted (operation 416) to reflect the neural signals producing the positive outcome and the association between the signals and object A is now confirmed (operation 417), so that the model may reliably be used to identify focus of attention in subsequent operation of the BCI.

A key aspect of this calibration method is having real-time feedback so as to improve attentional focus. It is found that receiving real-time feedback inspires users to focus more intently, thereby improving accuracy which can markedly enhance user satisfaction. The confirmatory sequence may be applied at intervals to ensure that calibration remains reliable.

Figure 5:
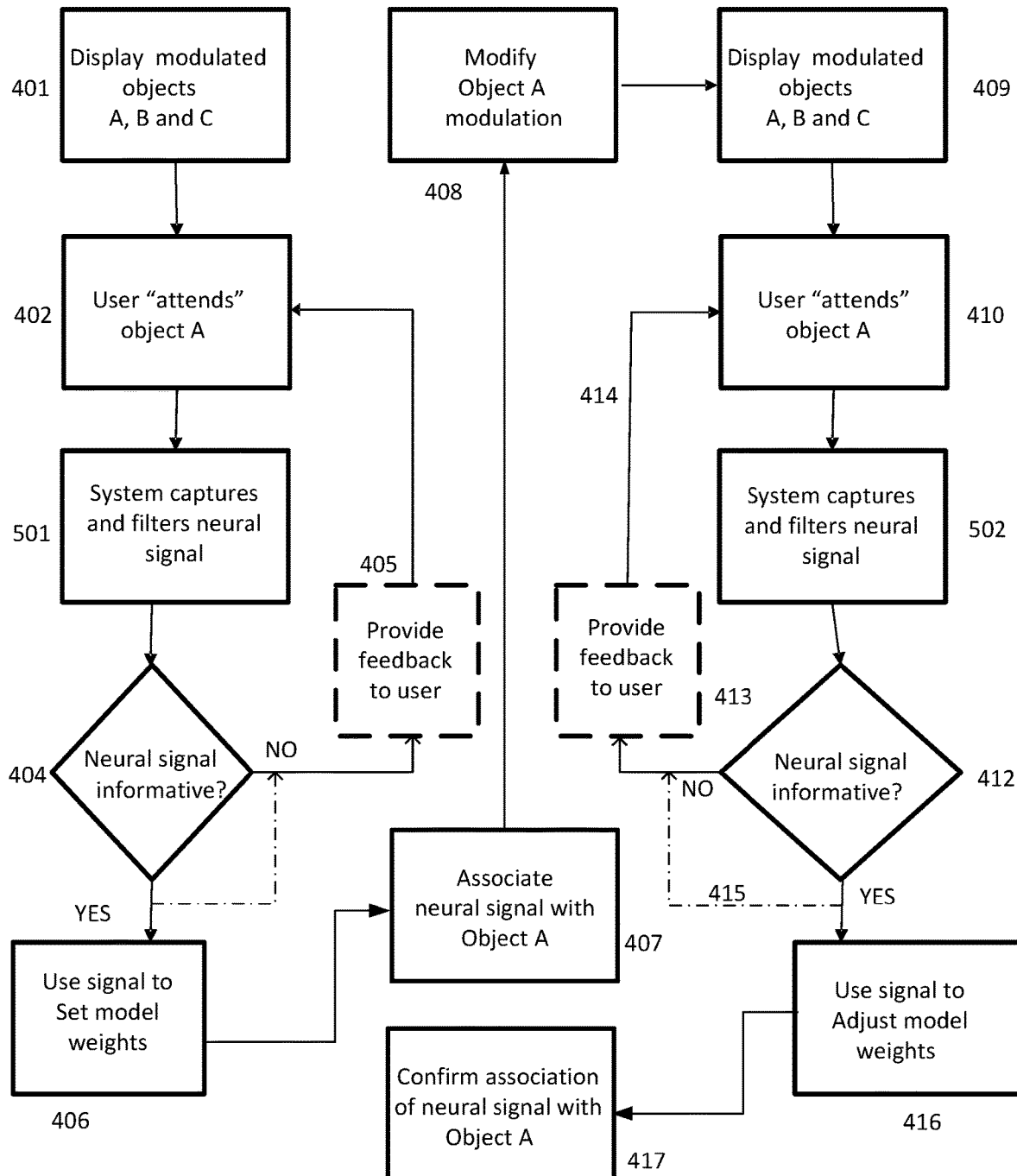
FIG. 5 shows a flow diagram showing the flow of certain functional blocks in another calibration method according to the present disclosure.

In FIG. 5, the same flow embodiment as in FIG. 4 is shown except that in the operation where the neural signals are captured, they are now also filtered, both in the initial sequence (operation 501) and in the confirmatory sequence (operation 502).

Figure 6:
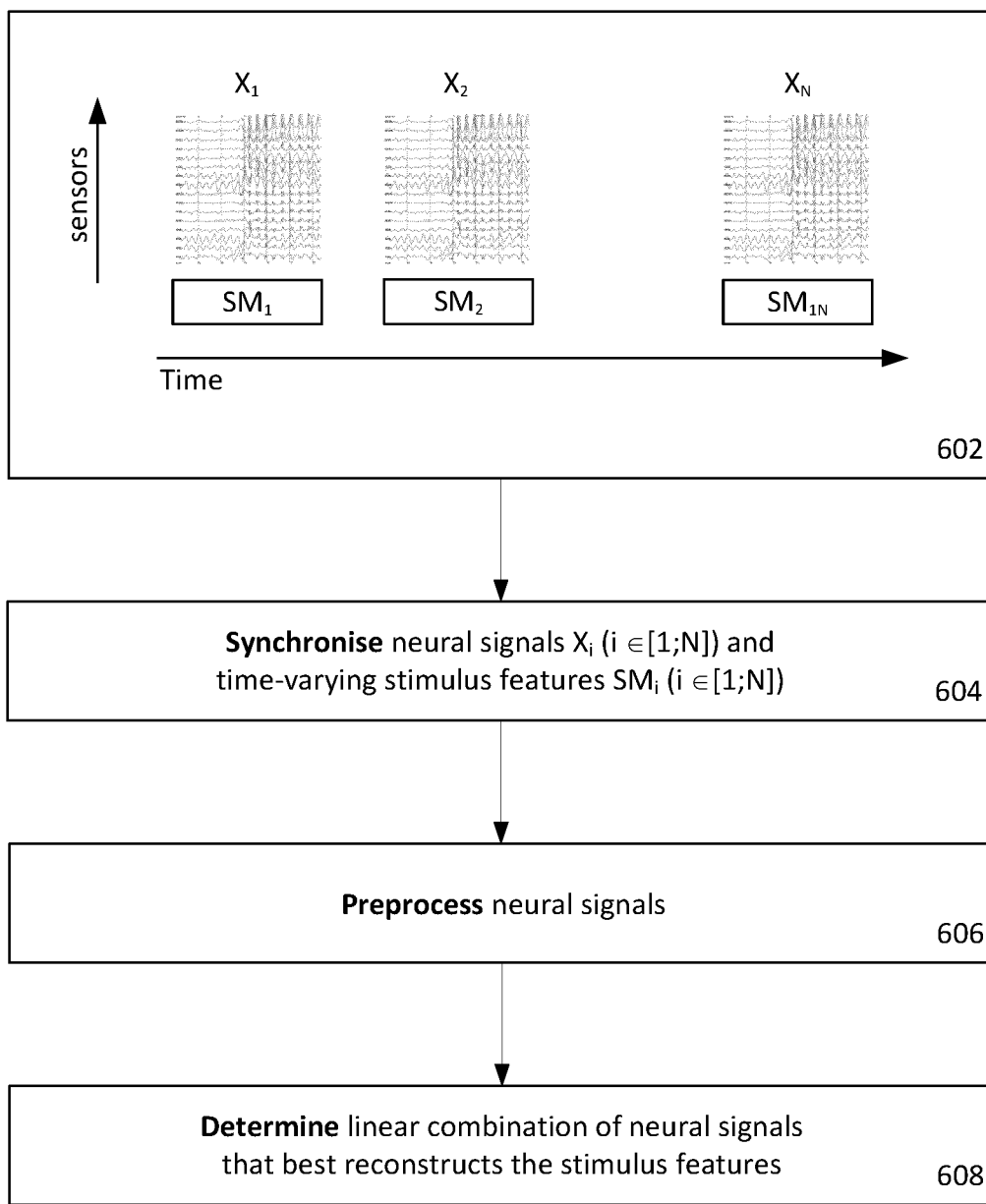
FIG. 6 shows an exemplary technique for constructing a decoding model according to the present disclosure.

FIG. 6 illustrates one technique for constructing a decoding model in which the model weights may be set and adjusted (as is done at operation 406). The decoding model is configured to decode the focus of attention of the user whose neural response is modelled. The decoding model is trained to "reconstruct" one or more time-varying features of the attended sensory stimulus (e.g. target object), henceforth referred to as "modulation signal". The time-varying features can be changes in luminance, contrast, color, frequency, size, position, or any stimulus feature whose influence can be directly or indirectly observed on the recorded neural signal.

As described above, an initial phase (operation 602) is conducted in which a set of neural signals $X_i$ is obtained for each of N target objects (where i is a member of [1, ..., N]) and time-varying stimulus features $SM_i$ are known.

In operation 604, the neural signals $X_i$ are synchronized with the corresponding time-varying stimulus features $SM_i$. The time-varying stimulus features $SM_i$ are conveniently provided with a timestamp or synchronization pattern.

During a pre-processing step (operation 606), the raw neural signals Xi are optionally denoised in order to optimize the signal to noise ratio (SNR). In the case of EEG for instance, the data can be considerably contaminated by several sources of noise: external/exogenous noise might stem from electrical artifacts (e.g. 50 Hz or 60 Hz line noise), whereas biological/endogenous noise can arise from muscle artifacts, eye blinks, electrocardiogram, task-unrelated brain activity, etc.

In one or several embodiments, neural signals $X_1, X_2, \ldots, X_N$ may be denoised prior to reconstructing the attended stimulus' modulation signal. For example, this denoising step can consist in a simple high-pass filter at circa 40 Hz to remove high frequency activity from the signals $X_1, X_2, \ldots, X_N$ including line noise.

Multivariate approaches can also be used, such as principal component analysis (PCA), independent component analysis (ICA), canonical components analysis (CCA), or any variants thereof, allow separating "useful" neural signal components (i.e. stemming from task-related brain activity) from less relevant components.

During a subsequent step (operation 608), the reconstruction model parameters are estimated. This estimation can be done in such a way that the reconstruction error is minimized. The reconstruction method may take the form of a plurality of parameters of combination of neural signals. These combination parameters are determined from a mathematical equation resolution method so as to estimate optimal parameters of combination, i.e. values $\alpha_j$ for which the application of the reconstruction model to the plurality of neural signals $X_{i,j}$ is recorded for a given stimulus produces a reconstructed modulation signal MSR that corresponds best to the modulation signal of the attended stimulus, that is, values for which the reconstruction error is minimal. In this context, the term "weights" refers to a linear or non-linear combination of EEG channel data that maximizes the similarity with the attended stimulus.

In one or several embodiments, the values $\alpha_j$ can be fixed (i.e. time-independent).

In other embodiments, these values (model weights) can be adjusted in real-time so as to account for possible adaption of the user's neural activity, or for possible variations of the SNR during a recording session.

In certain embodiments, the reconstruction model is a linear model, which produces a modulation signal MSR by a linear combination of neural signals $X_{i,j}$. In this case, the combination parameters are linear combination coefficients $\alpha j$, and mathematical equations are linear equations, and the reconstructed modulation signal MSR is computed from a linear combination of the neural signals $X_1, X_2, \ldots, X_N$ using the formula:

$$MSR = \Sigma_j \alpha_j X_j$$

In alternative embodiments, more sophisticated models can be used. One class of such models makes us of neural networks, for which the modulation signal MSR is obtained by a cascade of non-linear mathematical operations to the neural signals $X_1, X_2, \ldots, X_N$.

Once the stimulus has been "reconstructed", it can be compared with all the different stimuli presented to the user. The attended stimulus (the target) corresponds to the stimulus whose time-varying features SM are most similar to the reconstruction MSR.

For example, a convolutional network can be trained to match any incoming neural signal X with a modulation signal MSR, such that for two neural signals $X_1$ and $X_2$ recorded at different time points, are produced two modulation signals $MSR_1$ and $MSR_2$ which are similar when the user's attention is focused on the same target and dissimilar when the user's attention is focused on different targets. Several mathematical definitions of similarity can be used (for example it can be a simple Pearson correlation coefficient, or the inverse of the Euclidean distance, mutual information etc.). The reconstructed modulation signal is the multidimensional signal R generated by the neural network from the newly acquired EEG data.

The BCI described above may be used in conjunction with real world objects, rendering the objects controllable or otherwise subject to interaction. In certain embodiments, the generation of stimuli is handled by one or more light source (such as a light emitting diode, LED) provided in association with (or even, on the surface of) the controllable object.

In certain embodiments, the generation of stimuli is handled by a projector or a scanning laser device so that visual stimuli are projected onto the controllable object and the controllable object outputs a visual stimulus by reflecting a projected stimulus.

As was the case in the BCI using a display screen through which the user interacts with on-screen objects (in FIG. 1 for instance), the controllable objects in the present disclosure can be made to exhibit visual stimuli with characteristic modulations (e.g. blinking stimuli) so that the neural response to the presence of those stimuli become evident and decodable from neural signals captured by a neural signal capture device (such as an EEG device).

In certain embodiments, the determination of focus of attention upon a visual display of a controllable device is used to address a command to that controllable object. The controllable object may then implement an action based on said command: for example, the controllable object may emit an audible sound, unlock a door, switch on or off, change an operational state, etc. The action may also provide the user with visual or other feedback associated with the controllable object: this may be used in conjunction with the positive feedback loop discussed above but may also provide a real-time indication of the valid selection of an operation associated with the controllable object.

As the user is more focused using such feedback stimuli, it is observed that the user-specific model of stimulus reconstruction built in the initial or confirmatory phase of operation of the BCI system is more accurate while being constructed more rapidly.

Figure 7:
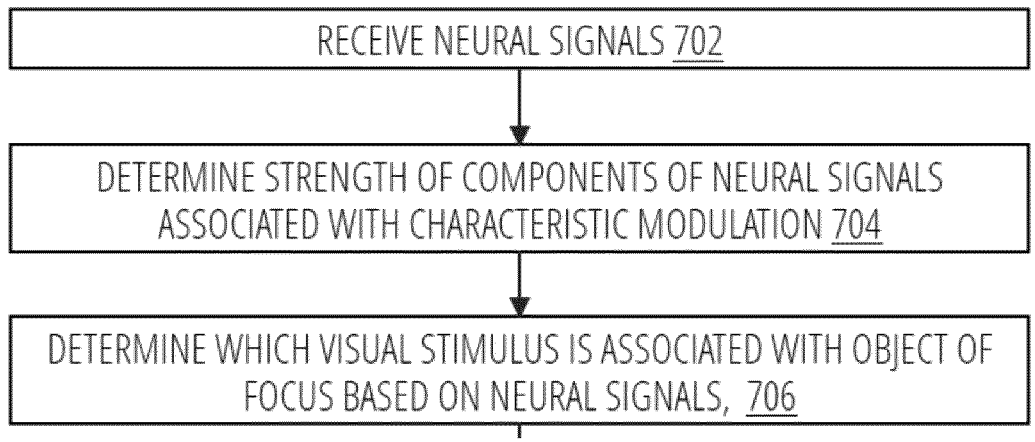
FIG. 7 illustrates the flow of certain main functional blocks in the method of operation of the BCI once calibration has been performed in accordance with the present disclosure.

In subsequent operational phases, the use of feedback stimuli as described above leads to improved accuracy and speed increases for the real-time BCI applications. When not performing initial or confirmatory calibration steps, the visual BCI system may operate in accordance with the functional blocks illustrated in FIG. 7.

In block 702, a hardware interfacing device (such as the SPU of FIG. 1) operatively coupled to a neural signal capture device and the stimulus generator (such as the EAU and DGU of FIG. 1), receives neural signals from the neural signal capture device.

In block 704, the interfacing device determines a strength of components of the neural signals having a property associated with the respective characteristic modulations of the or each visual stimulus.

In block 706, the interfacing device determines which of the at least one visual stimuli is associated with an object of focus of the user based on the neural signals, the object of focus being inferred by comparing the respective characteristic modulations of the at least one visual stimuli with modulations in a reconstructed sensory stimulus, the reconstructed sensory stimulus being reconstructed using the received neural signals, where the object of focus is the visual stimulus whose time-varying features is most similar to the reconstructed sensory stimulus.

Figure 9:
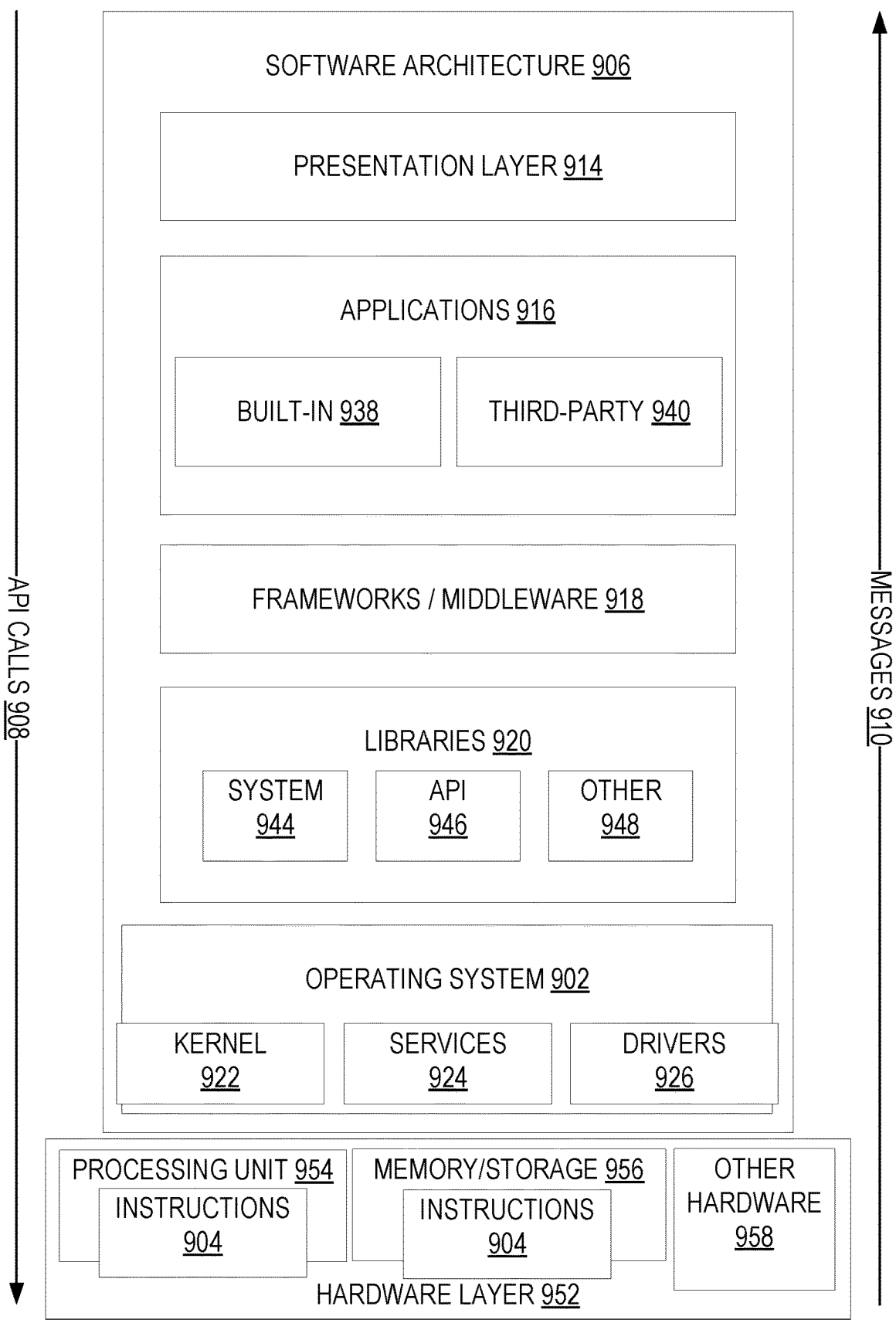
FIG. 9 is block diagram showing a software architecture within which the present disclosure may be implemented, in accordance with some example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1006, and input/output (I/O) components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, modules and so forth described herein. The hardware layer 952 also includes memory and/or storage modules shown as memory/storage 956, which also have the executable instructions 904. The hardware layer 952 may also comprise other hardware 958, for example dedicated hardware for interfacing with EEG electrodes and/or for interfacing with display devices.

In the example architecture of FIG. 9, the software architecture 906 may be conceptualized as a stack of layers where each layer provides particular functionality. For example, the software architecture 906 may include layers such as an operating system 902, libraries 920, frameworks or middleware 918, applications 916 and a presentation layer 914. Operationally, the applications 916 and/or other components within the layers may invoke application programming interface (API) calls 908 through the software stack and receive a response as messages 910. The layers illustrated are representative in nature and not all software architectures have all layers. For example, some mobile or special purpose operating systems may not provide the frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 may be responsible for controlling or interfacing with the underlying hardware. For instance, the drivers 926 may include display drivers, EEG device drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 may provide a common infrastructure that may be used by the applications 916 and/or other components and/or layers. The libraries 920 typically provide functionality that allows other software modules to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematic functions, and the like. In addition, the libraries 920 may include API libraries 946 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system or platform.

The applications 916 include built-in applications 938 and/or third-party applications 940.

The applications 916 may use built-in operating system functions (e.g., kernel 922, services 924, and/or drivers 926), libraries 920, or frameworks/middleware 918 to create user interfaces to interact with users of the system. Alternatively, or additionally, in some systems interactions with a user may occur through a presentation layer, such as the presentation layer 914. In these systems, the application/module "logic" can be separated from the aspects of the application/module that interact with a user.

Figure 10:
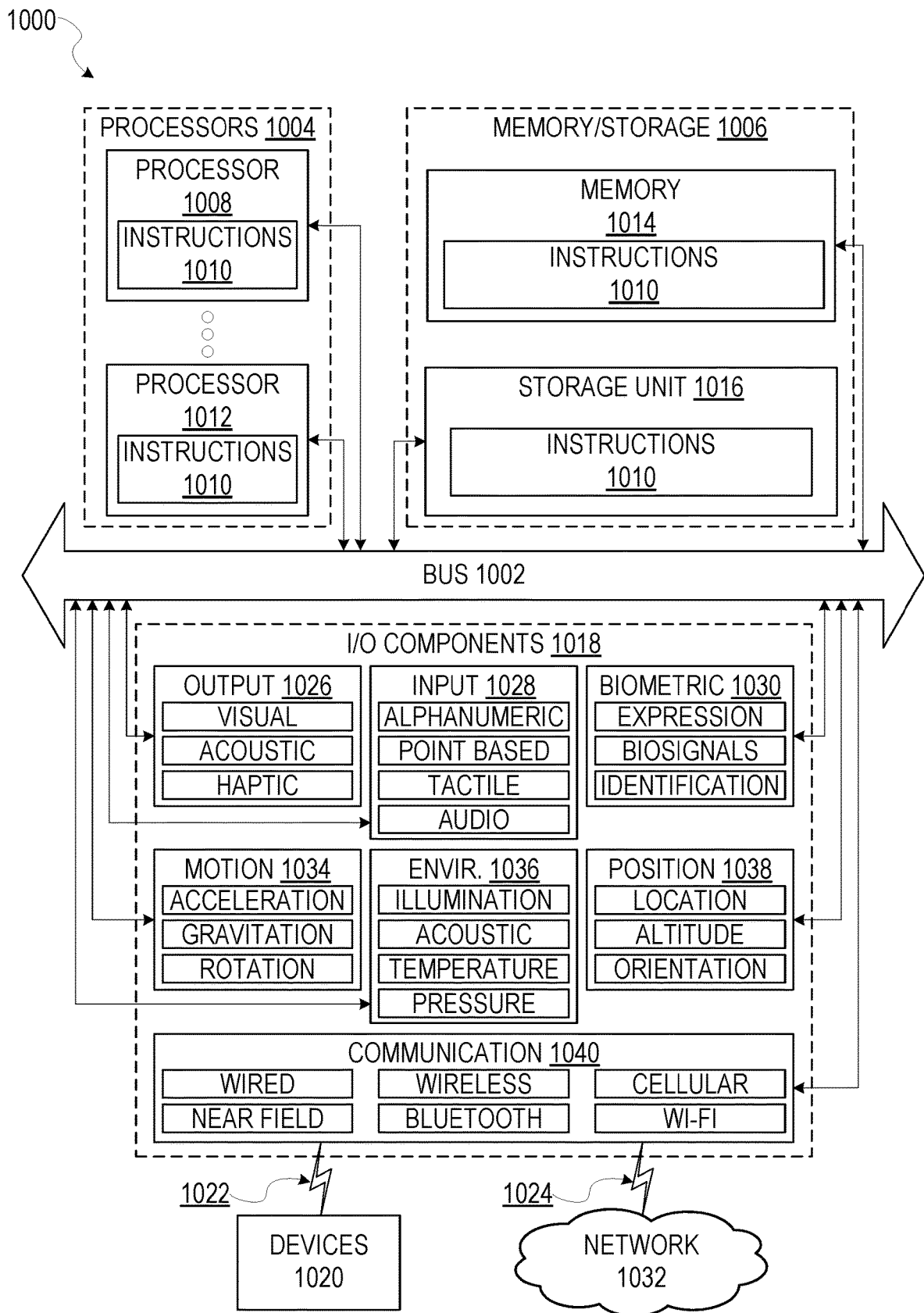
FIG. 10 is a diagrammatic representation of a machine, in the form of a computer system, within which a set of instructions may be executed for causing the machine to perform any one or more of the methodologies discussed, in accordance with some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. The SPU, the EAU and the DGU of FIG. 1 may each be implemented as machine having some or all of the components of the machine 1000. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory 1006, and input/output (I/O) components 1018, which may be configured to communicate with each other such as via a bus 1002. In an example embodiment, the processors 1004 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that may execute the instructions 1010. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1006 may include a memory 1014, such as a main memory, a static memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1010. The term "machine-readable medium" shall also be taken to include any medium, or combination of multiple media, that is capable of storing instructions (e.g., instructions 1010) for execution by a machine (e.g., machine 1000), such that the instructions, when executed by one or more processors of the machine 1000 (e.g., processors 1004), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1018 may include a wide variety of components to receive input, provide output, produce output, transmit information, exchange information, capture measurements, and so on. The specific input/output (I/O) components 1018 that are included in a particular machine will depend on the type of machine. For example, user interface machines and portable machines such as mobile phones will likely include a touch input device or other such input mechanisms, while a headless server machine will likely not include such a touch input device. It will be appreciated that the input/output (I/O) components 1018 may include many other components that are not shown in FIG. 10.

The input/output (I/O) components 1018 are grouped according to functionality merely for simplifying the following discussion and the grouping is in no way limiting. In various example embodiments, the input/output (I/O) components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 1018 may include biometric components 1030, motion components 1034, environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves, such as the output from an EEG device), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1018 may include communication components 1040 operable to couple the machine 1000 to a network 1032 or devices 1020 via a coupling 1024 and a coupling 1022 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)). Where an EEG device or display device is not integral with the machine 1000, the device 1020 may be an EEG device and/or a display device.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

EXAMPLES

To better illustrate the methods and system disclosed herein, a non-limiting list of examples is provided here:

Example 1: A method for adaptive calibration of brain-computer interfaces comprising:
   a. displaying, on display screen, one or more objects;
   b. modulating display characteristics of said one or more objects such that each has a unique time-varying display characteristic;
   c. looking, by a user, at a first displayed object among said one or more objects on said display screen;
   d. detecting and recording, by a system, a first set of current neural signals detected from said user;
   e. associating said first set of current neural signals with said first displayed object on said display screen;
   f. altering said modulating of said display characteristics of said first displayed object;
   g. detecting and recording, by said system, a second set of said current neural signals detected from said user;
   h. associating said second set of neural signals with said first displayed object to confirm said first displayed object is being attended;

i. modeling, if confirmed, recorded neural signals associated with said first displayed object;
j. using model of said recorded neural signals to identify when said user is attending said first displayed object;
k. repeating steps a through j for said one or more objects as user attends, in turn, each of said one or more objects;
l. repeating steps a through k while modifying modeling weighting and said modulating display characteristics to optimize accuracy of attended object determination.

Example 2: A method as in Example 1 further comprising:
determining if said neural signal contains artifacts; and
deciding, if said neural signal contains artifacts, if said neural signal is informative.

Example 3: A method as in Example 1: further comprising:
filtering said neural signals to mitigate noise;
determining if filtered neural signal contain artifacts; and
deciding, if said filtered neural signal contains artifacts, if said filtered neural signal is informative.

Example 4: A method as in Example 2 further comprising:
feeding back to said user indication that said neural signal is usable, if said neural signal is said usable;
feeding back to said user indication that said neural signal is unusable, if said neural signal is said unusable; and
instructing said user to take one or more actions to correct for said unusable neural signal.

Example 5: A method as in Example 3 further comprising:
feeding back to said user said indication that said filtered neural signal is said usable, if said filtered neural signal is said usable;
feeding back to said user said indication that said filtered neural signal is said unusable, if said filtered neural signal is said unusable; and
instructing said user to take said one or more actions to correct for said unusable filtered neural signal.

Example 6: A computer implemented method comprising, in at least one processor:
in an initial phase, receiving, from a neural signal capture device, a first set of neural signals for a user, the user perceiving sensory information in a training sequence, the training sequence including at least one sensory stimulus, each sensory stimulus having at least one predetermined corresponding characteristic modulation;
determining, from the first set of neural signals and the training sequence, neural response data associated with each of the one or more sensory stimuli, the neural response data being combined to generate a model of user neural response to sensory stimuli, the model including weights applied to features of the neural signals;
in a calibration phase, receiving, from the neural signal capture device, a second set of neural signals for the user, the user perceiving further sensory information in a confirmation sequence, the confirmation sequence including at least one of the sensory stimuli;
using the model, estimating which of the sensory stimuli is an object of focus of the user;
determining whether the estimated identification of the object of focus corresponds to the sensory stimuli in the confirmatory sequence;
if a correspondence is determined, modifying the weights; and
if no correspondence is determined, modifying the sensory stimuli in the confirmation sequence.

Example 7: The method of Example 6, wherein modifying the sensory stimuli in the confirmation sequence includes modifying at least one of: the corresponding characteristics of at least one sensory stimulus; reducing the number of sensory stimuli in the confirmatory sequence; and altering an appearance of the sensory stimuli in the confirmatory sequence.

Example 8: The method of Example 6 or Example 7, wherein at least one sensory stimulus is a visual stimulus, wherein the training sequence includes displayed training image data viewed by the user, and wherein the training image data includes the visual stimulus.

Example 9: The method of Example 8, wherein the or each visual stimulus is displayed in a known sequence.

Example 10: The method of Example 8 or Example 9, wherein the training image data includes the or each visual stimulus displayed at known display locations.

Example 11: The method of any one of Examples 8 to 10, wherein the predetermined corresponding characteristic modulation is a change in at least one of display location, luminance, contrast, blink frequency, color, and/or scale.

Example 12: The method of any one of Examples 5 to 11, wherein the at least one sensory stimulus is an audio stimulus, the training sequence including training audio data heard by the user, and wherein the training audio data includes the audio stimulus.

Example 13: The method of any one of Examples 5 to 12, wherein the at least one sensory stimulus is a haptic stimulus, the training sequence including training haptic data felt by the user, and wherein the training haptic data includes the haptic stimulus.

Example 14: The method of any one of Examples 5 to 13, wherein estimating which of the sensory stimuli is an object of focus of the user comprises:
comparing the different stimuli in the training sequence with a reconstructed sensory stimulus, reconstructed using the second set of neural signals; and
determining that the object of focus is the stimulus whose time-varying features are most similar to the reconstructed sensory stimulus.

Example 15: The method of any one of Examples 5 to 14, further comprising repeating the operations of the calibration phase.

Example 16: The method of any one of Examples 5 to 15, wherein the sensory stimuli correspond to control items, the method further comprising performing a control task with respect to the control item associated with the inferred focus of attention.

Example 17: The method of any one of Examples 5 to 16, further comprising filtering the received neural signals to mitigate noise before determining the neural response data used to generate the model.

Example 18: The method of any one of Examples 5 to 17, further comprising:
determining whether the received neural signals contain artifacts; and
where the neural signals contains artifacts, rejecting the received neural signals.

Example 19: The method of Example 18, further comprising:
where the neural signals contains no artifacts, feeding back to said user an indication that said neural signal is usable;
where the neural signals contains artifacts, feeding back to said user indication that said neural signal is unusable, if said neural signal is said unusable; and
instructing said user to take one or more actions to correct for said unusable neural signal.

Example 20: A brain computer interface system, comprising:
 a sensory information generation unit configured to output a signal for reproduction by a reproduction device, the reproduced signal being perceived by a user as sensory information;
 a neural signal capture device configured to capture neural signals associated with a user; and
 a signal processing unit operatively coupled to the sensory information generation unit and the neural signal capture device, the signal processing unit being configured to:
  in an initial phase, receive, from the neural signal capture device, a first set of neural signals for the user, the user perceiving the sensory information in a training sequence, the training sequence including at least one sensory stimulus, each sensory stimulus having at least one predetermined corresponding characteristic;
  determine, from the first set of neural signals and the training sequence, neural response data associated with each of the one or more sensory stimuli, the neural response data being combined to generate a model of user neural response to sensory stimuli, the model including weights applied to features of the neural signals;
  in a calibration phase, receive, from the neural signal capture device, a second set of neural signals for the user, the user perceiving further sensory information in a confirmation sequence, the confirmation sequence including at least one of the sensory stimuli;
  using the model, estimate which of the sensory stimuli is an object of focus of the user;
  determine whether the estimated identification of the object of focus corresponds to the sensory stimuli in the confirmatory sequence;
  if a correspondence is determined, modify the weights; and
  if no correspondence is determined, modify the sensory stimuli in the confirmation sequence.

Example 21: The brain computer interface system of Example 20,
 wherein at least one sensory stimulus is a visual stimulus,
 wherein the sensory information in the training sequence includes displayed training image data viewed by the user, the training image data including the visual stimulus,
 wherein the further sensory information in the confirmation sequence includes displayed confirmation image data viewed by the user, the confirmation image data including the visual stimulus, and
 wherein the sensory information generation unit includes a display generation unit (DGU) configured to cause a display to reproduce the training image data and the confirmation image data.

Example 22: A non-transitory computer-readable storage medium, the computer-readable storage medium storing instructions that, when executed by a computer system, cause the computer system to perform operations comprising:
 in an initial phase, receiving, from a neural signal capture device, a first set of neural signals for a user, the user perceiving sensory information in a training sequence, the training sequence including at least one sensory stimulus, each sensory stimulus having at least one predetermined corresponding characteristic;
 determining, from the first set of neural signals and the training sequence, neural response data associated with each of the one or more sensory stimuli, the neural response data being combined to generate a model of user neural response to sensory stimuli, the model including weights applied to features of the neural signals;
 in a calibration phase, receiving, from the neural signal capture device, a second set of neural signals for the user, the user perceiving further sensory information in a confirmation sequence, the confirmation sequence including at least one of the sensory stimuli;
 using the model, estimating which of the sensory stimuli is an object of focus of the user;
 determining whether the estimated identification of the object of focus corresponds to the sensory stimuli in the confirmatory sequence;
 if a correspondence is determined, modifying the weights; and
 if no correspondence is determined, modifying the sensory stimuli in the confirmation sequence.

Example 23: A computer-readable storage medium, the computer-readable storage medium carrying instructions that, when executed by a computer, cause the computer to perform the method of any one of Examples 5 to 19.

The figures are meant to be exemplary and should not be read as limiting the scope or steps to only those. In a case where the system displays only a single object, the same method applies. In a case where the system displays more than three objects, the same method applies. Although the objects are shown having different two-dimensional shapes, this is for clarity. The objects may have any shape, any color, and be located anywhere on the display screen. The sequence of successive object attendance and calibration can be done in any order and need not be one of a sequence of adjacent objects.

Although described through a number of detailed exemplary embodiments, the portable devices for the acquisition of electroencephalographic signals according to the present disclosure comprise various variants, modifications and improvements which will be obvious to those skilled in the art, it being understood that these various variants, modifications and improvements fall within the scope of the subject of the present disclosure, as defined by the following claims.

What is claimed is:
1. A computer implemented method comprising, in at least one processor:
 in an initial phase, receiving, from a neural signal capture device, a first set of neural signals for a user, the user perceiving sensory information in a training sequence, the training sequence including one or more sensory stimuli, each sensory stimulus having at least one predetermined corresponding characteristic;
 determining, from the first set of neural signals and the training sequence, neural response data associated with each of the one or more sensory stimuli, the neural response data being combined to generate a model of user neural response to sensory stimuli, the model of user neural response to sensory stimuli including weights applied to features of the neural signals;
 in a calibration phase, receiving, from the neural signal capture device, a second set of neural signals for the user, the user perceiving further sensory information in a confirmation sequence, the confirmation sequence including at least one of the sensory stimuli;
 using the model of user neural response to sensory stimuli, estimating which of the sensory stimuli is an object of focus of the user as an estimated identification of the object of focus;
 determining whether the estimated identification of the object of focus corresponds to the sensory stimuli in the confirmation sequence;

if a correspondence is determined, modifying the weights; and if no correspondence is determined, modifying the sensory stimuli in the confirmation sequence.

2. The method of claim 1, wherein modifying the sensory stimuli in the confirmation sequence includes modifying at least one of: the corresponding characteristics of at least one sensory stimulus; reducing a number of sensory stimuli in the confirmation sequence; and altering an appearance of the sensory stimuli in the confirmation sequence.

3. The method of claim 1, wherein at least one sensory stimulus is a visual stimulus, wherein the training sequence includes displayed training image data viewed by the user, and wherein the training image data includes the visual stimulus.

4. The method of claim 3, wherein the or each visual stimulus is displayed in a known sequence.

5. The method of claim 3, wherein the training image data includes the or each visual stimulus displayed at known display locations.

6. The method of claim 3, wherein the at least one predetermined corresponding characteristic comprises at least one of a change in at least one of display location, luminance, contrast, blink frequency, color, or scale.

7. The method of claim 1, wherein the at least one sensory stimulus is an audio stimulus, the training sequence including training audio data heard by the user, and wherein the training audio data includes the audio stimulus.

8. The method of claim 1, wherein the at least one sensory stimulus is a haptic stimulus, the training sequence including training haptic data felt by the user, and wherein the training haptic data includes the haptic stimulus.

9. The method of claim 1, wherein estimating which of the sensory stimuli is an object of focus of the user comprises:
comparing each sensory stimuli in the training sequence with a reconstructed sensory stimulus, reconstructed using the second set of neural signals; and
determining that the object of focus is a sensory stimulus whose time-varying features are most similar to the reconstructed sensory stimulus.

10. The method of claim 1, further comprising repeating the calibration phase.

11. The method of claim 1, wherein the sensory stimuli correspond to control items, the method further comprising performing a control task with respect to a control item associated with the estimated identification of the object of focus.

12. The method of claim 1, further comprising filtering the received neural signals to mitigate noise before determining the neural response data used to generate the model of user neural response to sensory stimuli.

13. The method of claim 1, further comprising:
determining whether the received neural signals contain artifacts; and
where the neural signals contains artifacts, rejecting the received neural signals.

14. The method of claim 13, further comprising:
where the neural signals contains no artifacts, feeding back to said user an indication that said neural signal is usable;
where the neural signals contains artifacts, feeding back to said user indication that said neural signal is unusable, if said neural signal is said unusable; and
instructing said user to take one or more actions to correct for said unusable neural signal.

15. A brain computer interface system, comprising:
a sensory information generation unit configured to output a signal for reproduction by a reproduction device, the signal being perceived by a user as sensory information;
a neural signal capture device configured to capture neural signals associated with a user; and
a signal processing unit operatively coupled to the sensory information generation unit and the neural signal capture device, the signal processing unit being configured to:
in an initial phase, receive, from the neural signal capture device, a first set of neural signals for the user, the user perceiving the sensory information in a training sequence, the training sequence including one or more sensory stimuli, each sensory stimulus having at least one predetermined corresponding characteristic;
determine, from the first set of neural signals and the training sequence, neural response data associated with each of the one or more sensory stimuli, the neural response data being combined to generate a model of user neural response to sensory stimuli of user neural response to sensory stimuli, the model of user neural response to sensory stimuli including weights applied to features of the neural signals;
in a calibration phase, receive, from the neural signal capture device, a second set of neural signals for the user, the user perceiving further sensory information in a confirmation sequence, the confirmation sequence including at least one of the sensory stimuli;
using the model of user neural response to sensory stimuli, estimate which of the sensory stimuli is an object of focus of the user as an estimated identification of the object of focus;
determine whether the estimated identification of the object of focus corresponds to the sensory stimuli in the confirmation sequence;
if a correspondence is determined, modify the weights; and
if no correspondence is determined, modify the sensory stimuli in the confirmation sequence.

16. The brain computer interface system of claim 15, wherein at least one sensory stimulus is a visual stimulus, wherein the sensory information in the training sequence includes displayed training image data viewed by the user, the training image data including the visual stimulus,
wherein the further sensory information in the confirmation sequence includes displayed confirmation image data viewed by the user, the confirmation image data including the visual stimulus, and
wherein the sensory information generation unit includes a display generation unit (DGU) configured to cause a display to reproduce the training image data and the confirmation image data.

17. The brain computer interface system of claim 15, wherein estimating which of the sensory stimuli is an object of focus of the user comprises:
comparing each sensory stimuli in the training sequence with a reconstructed sensory stimulus, reconstructed using the second set of neural signals; and
determining that the object of focus is a sensory stimulus whose time-varying features are most similar to the reconstructed sensory stimulus.

18. A non-transitory computer-readable storage medium, the computer-readable storage medium carrying instructions that, when executed by a computer, cause the computer to perform operations comprising:

in an initial phase, receiving, from a neural signal capture device, a first set of neural signals for a user, the user perceiving sensory information in a training sequence, the training sequence including one or more sensory stimuli stimulus, each sensory stimulus having at least one predetermined corresponding characteristic;

determining, from the first set of neural signals and the training sequence, neural response data associated with each of the one or more sensory stimuli, the neural response data being combined to generate a model of user neural response to sensory stimuli of user neural response to sensory stimuli, the model of user neural response to sensory stimuli including weights applied to features of the neural signals;

in a calibration phase, receiving, from the neural signal capture device, a second set of neural signals for the user, the user perceiving further sensory information in a confirmation sequence, the confirmation sequence including at least one of the sensory stimuli;

using the model of user neural response to sensory stimuli, estimating which of the sensory stimuli is an object of focus of the user as an estimated identification of the object of focus;

determining whether the estimated identification of the object of focus corresponds to the sensory stimuli in the confirmation sequence;

if a correspondence is determined, modifying the weights; and if no correspondence is determined, modifying the sensory stimuli in the confirmation sequence.

19. The non-transitory computer-readable storage medium of claim 18,
wherein at least one sensory stimulus is a visual stimulus,
wherein the sensory information in the training sequence includes displayed training image data viewed by the user, the training image data including the visual stimulus,
wherein the further sensory information in the confirmation sequence includes displayed confirmation image data viewed by the user, the confirmation image data including the visual stimulus, and
wherein the sensory information generation unit includes a display generation unit (DGU) configured to cause a display to reproduce the training image data and the confirmation image data.

20. The non-transitory computer-readable storage medium of claim 18, wherein estimating which of the sensory stimuli is an object of focus of the user comprises:
comparing each sensory stimuli in the training sequence with a reconstructed sensory stimulus, reconstructed using the second set of neural signals; and
determining that the object of focus is a sensory stimulus whose time-varying features are most similar to the reconstructed sensory stimulus.

* * * * *